United States Patent
Khandelwal et al.

(10) Patent No.: US 12,288,317 B2
(45) Date of Patent: Apr. 29, 2025

(54) METHOD AND SYSTEM FOR ENHANCING IMAGE QUALITY BY MULTI-FRAME BLENDING

(71) Applicant: SAMSUNG ELECTRONICS CO., LTD., Suwon-si (KR)

(72) Inventors: Gaurav Khandelwal, Bengaluru (IN); Sachin Deepak Lomte, Bengaluru (IN); Umang Chaturvedi, Bengaluru (IN); Diplav, Bengaluru (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 17/890,868

(22) Filed: Aug. 18, 2022

(65) Prior Publication Data
US 2023/0014050 A1   Jan. 19, 2023

Related U.S. Application Data

(63) Continuation of application No. PCT/KR2022/007744, filed on May 31, 2022.

(30) Foreign Application Priority Data

Jul. 7, 2021  (IN) .............................. 202141030525
Jan. 18, 2022  (IN) .............................. 202141030525

(51) Int. Cl.
*G06T 7/00* (2017.01)
*G06T 5/50* (2006.01)
(Continued)

(52) U.S. Cl.
CPC ............. *G06T 7/0002* (2013.01); *G06T 5/50* (2013.01); *G06T 5/70* (2024.01); *G06V 10/44* (2022.01);
(Continued)

(58) Field of Classification Search
None
See application file for complete search history.

(56) References Cited

U.S. PATENT DOCUMENTS 7,683,931 B2 *  3/2010  Pirzada ................. H04N 17/02
                                                348/192
9,282,235 B2 *  3/2016  Lindskog ............... G03B 13/36
(Continued)

FOREIGN PATENT DOCUMENTS

CN   111917994 A       11/2020
EP     2987135 A2 *    2/2016 ............. G06T 5/007
(Continued)

OTHER PUBLICATIONS

Communication issued on Mar. 24, 2023 by the Indian Patent Office for Indian Patent Application No. 202141030525.
(Continued)

*Primary Examiner* — Akwasi M Sarpong
*Assistant Examiner* — Pawan Dhingra
(74) *Attorney, Agent, or Firm* — Sughrue Mion, PLLC

(57) ABSTRACT

A method for enhancing image quality may be provided. The method may include receiving a plurality of input frames and metadata, and determining one or more feature scores for a received input frame from the plurality of input frames. The method may further include determining a parametric score for the received input frame based on an analysis of the one or more feature scores of the received input frame and the metadata. The method may include identifying one or more artifacts for correction in the received input frame based on the parametric score, and determining a strength of correction required for at least one identified artifact in the received input frame based on the parametric score, then applying the determined strength of correction to the received input frame. The method may further include
(Continued)

performing multi-frame blending for a plurality of received input frames with applied determined strength of correction.

10 Claims, 14 Drawing Sheets

(51) Int. Cl.
*G06T 5/70* (2024.01)
*G06V 10/44* (2022.01)

(52) U.S. Cl.
CPC ............... *G06T 2207/10016* (2013.01); *G06T 2207/20221* (2013.01); *G06T 2207/30168* (2013.01)

(56) References Cited

U.S. PATENT DOCUMENTS

| | | | | |
|---|---|---|---|---|
| 2009/0316009 | A1* | 12/2009 | Ito | G06T 5/70 348/208.4 |
| 2014/0286593 | A1* | 9/2014 | Numata | G06T 5/50 382/275 |
| 2016/0098821 | A1* | 4/2016 | Lee | G06T 5/70 382/260 |
| 2018/0192098 | A1* | 7/2018 | Pekkucuksen | H04N 7/0117 |
| 2020/0143521 | A1* | 5/2020 | Wang | G06T 5/50 |
| 2020/0267300 | A1* | 8/2020 | Zhen | G06T 5/94 |
| 2021/0065341 | A1* | 3/2021 | Zhang | G06T 5/50 |
| 2021/0104021 | A1* | 4/2021 | Sohn | G06T 5/70 |

FOREIGN PATENT DOCUMENTS

| | | | | |
|---|---|---|---|---|
| EP | 2987135 B1 | | 10/2019 | |
| WO | WO-2017131343 A1 | * | 8/2017 | ............ G06T 5/003 |
| WO | 2018-130600 A1 | | 7/2018 | |

OTHER PUBLICATIONS

International Search Report (ISA/210) issued Sep. 7, 2022 by the ISA for International Application No. PCT/KR2022/007744.
Written Opinion (ISA/237) issued Sep. 7, 2022 by the ISA for International Application No. PCT/KR2022/007744.
European Extended Search Report issued Jun. 12, 2024 by the European Patent Office for EP Patent Application No. 22837823.8.

* cited by examiner

MFP O/P - Default

MFP O/P - Default

METHOD AND SYSTEM FOR ENHANCING IMAGE QUALITY BY MULTI-FRAME BLENDING

CROSS-REFERENCE TO RELATED APPLICATIONS

This application is a bypass continuation of International Application No. PCT/KR2022/007744, filed on May 31, 2022, in the Korean Intellectual Property Receiving Office, which is based on and claims priority to Indian Patent Application No. IN202141030525, filed Jul. 7, 2021 and Indian Patent Application No. IN202141030525, filed Jan. 18, 2022, in the Indian Intellectual Property Office, the disclosures of which are incorporated by reference herein in their entireties.

BACKGROUND

1. Field

The present invention generally relates to an image processing and more particularly relates to a system and method for enhancing image quality.

2. Description of Related Art

Multi-frame blending is a well-known technique to improve the quality of the captured images in low light and extreme low light conditions. But this blended output usually suffers from multiple artifacts due to the noise in the input frames. Since multi-frame blending uses burst capture frames as inputs, all the well-known methods apply pre-processing methods such as denoising, edge enhancement etc., to all the input frames before passing to multi-frame blending. These said solutions apply the same settings to all the inputs frames irrespective of their noise/feature's characteristics. Some frames could be noisier, some could be having better details and less noise, some may have more brightness etc.

FIG. 1 illustrates a flow diagram 100 depicting a conventional way of multi-frame blending of plurality of input frames. In the conventional way, a plurality of burst raw noisy images frame is received by at least one image sensor 101 for a multi-frame blending. Then, it applies performs frame pre-processing 125 using suitable frame pre-processing techniques to the input frames for denoising on each of the received input frames, or sharpness enhancement on each of the received input frames. Thereafter, the multi-frame blending 105 process may include reference frame selection 110 image registration 115, and blending 120. However, the blended output 130 is having artifacts such as noise, blur edges, and color artifacts. Therefore, there is need for a method that reduces the efforts/processing required to remove the anomalies generated through multi-frame blending.

SUMMARY

This summary is provided to introduce a selection of concepts in a simplified format that are further described in the detailed description of the invention. This summary is not intended to identify key or essential inventive concepts of the invention, nor is it intended for determining the scope of the invention.

According to an embodiment of the present disclosure, a method for enhancing image quality may be provided. The method may include receiving a plurality of input frames and metadata from an image sensor. The method may include determining one or more feature scores for a received input frame from the plurality of input frames. The method may include determining a parametric score for the received input frame based on an analysis of the determined one or more feature scores of the received input frame and the metadata. The method may include identifying one or more artifacts for correction in the received input frame based on the parametric score. The method may include determining a strength of correction required for at least one identified artifact in the received input frame based on the parametric score. The method may include applying the determined strength of correction to the received input frame. The method may include performing multi-frame blending for a plurality of received input frames with applied determined strength of correction.

The method may include extracting at least one feature of the received input frame using a contextual data, wherein the contextual data is determined based on one or more image capture condition including ISO per frame, exposure time, and light condition; and calculating a score of the at least one extracted feature of the received input frame based on a level of the at least one extracted feature.

The method may further include generating a vector score of at least one of the one or more feature scores of the received input frame based on a weighted average of the one or more feature scores of the received input frame; blending generated vector score of the one or more feature scores of the received input frame; scaling the blended vector score; and correlating one or more feature vector scores respective of each of the one or more generated feature vectors based on scaled score of the blended vector score.

The method may further include estimating a quality of at least one feature of one or more features of the received input frame based on the parametric score, wherein the quality is estimated based on at least one of peak signal-to-noise ratio (PSNR), Structural Similarity Index (SSIM) or multi-scale structural similarity (MS-SSIM) rating perceptual quality; prioritizing the one or more features based on the estimated quality of the received input frame; determining the strength of correction, based on the estimated quality and the prioritizing, for at least one artifact in the received input frame; and applying the determined strength of correction in the received input frame based on the parametric score.

The method may further include adjusting the parametric score of the received input frame to produce an optimal result in a low light conditions.

The method may further include updating the parametric score with a change in the image capture condition; and controlling the parametric score based on the metadata.

According to an embodiment, the metadata may include at least one of ISO values, BV values, and exposure values of the image sensor.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
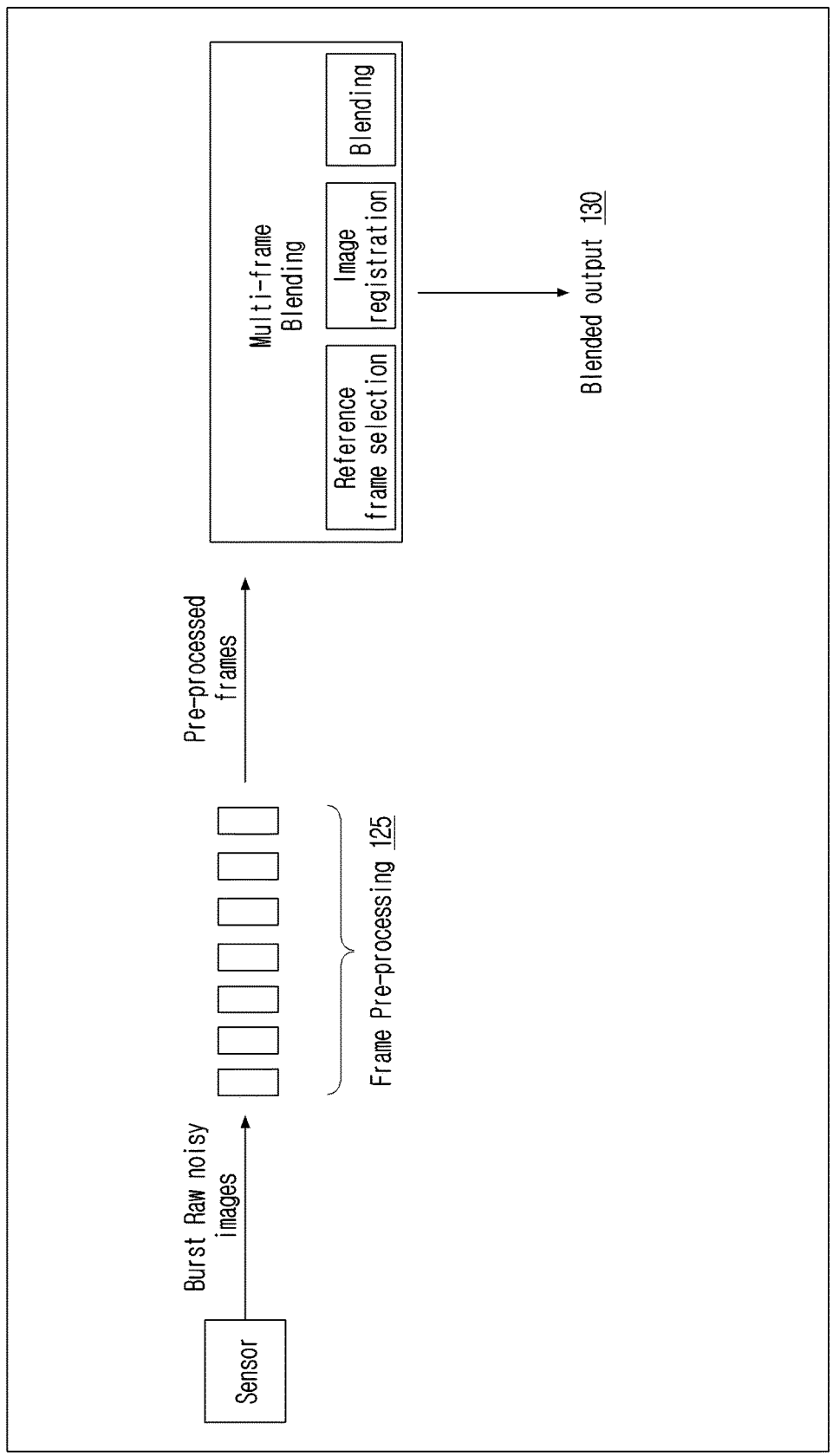
FIG. 1 illustrates a flow diagram depicting a process of multi-frame blending of plurality of input frames, according to an existing technique.

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

In the description, the term "A or B", "at least one of A or B", "at least one of A and B", or "one or more of A or/and B" may include all possible combinations of the items that are enumerated together. For example, the term "A or B" or "at least one of A or/and B" may designate (1) only A, (2) only B, or (3) both A and B.

The expression "1", "2", "first", or "second" as used herein may modify a variety of elements, irrespective of order and/or importance thereof, and to distinguish one element from another, without limiting the corresponding elements.

Unless otherwise defined, all terms, and especially any technical and/or scientific terms, used herein may be taken to have the same meaning as commonly understood by one having an ordinary skill in the art.

Figure 2:
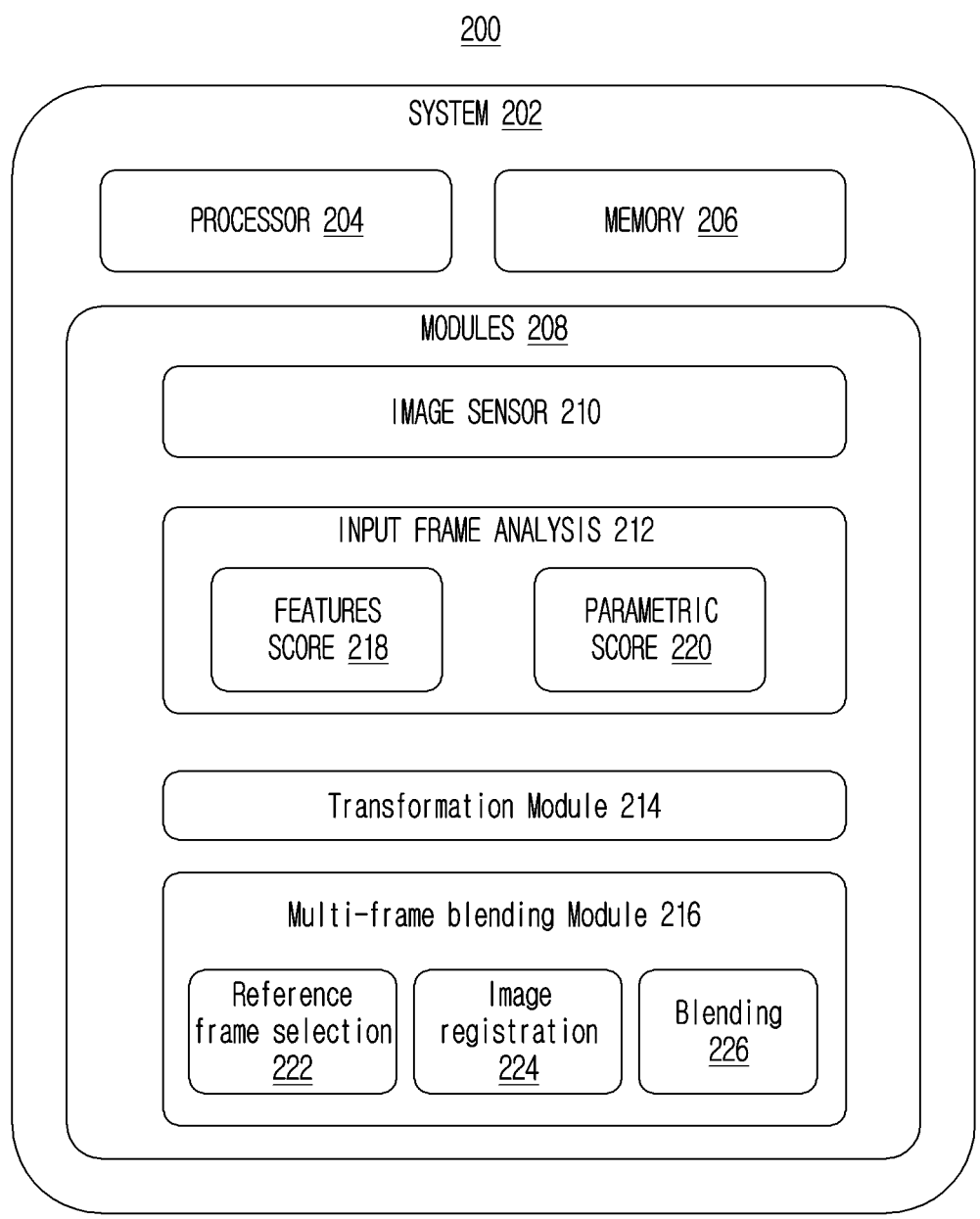
FIG. 2 illustrates the block diagram of a system for enhancing image quality according to an embodiment of the present subject matter.

Embodiments of the present invention will be described below in detail with reference to the accompanying drawings. Embodiments of the present disclosure are related to the system for a system for enhancing image quality. FIG. 2 illustrates a block diagram 200 of a system 202 for enhancing image quality, according to an embodiment of the present subject matter. In an embodiment, the system 202 may be incorporated in a User Equipment (UE). Examples of the UE may include, but are not limited to a television, a laptop, a tab, a smart phone, a Personal Computer (PC). The system improves the perceptual quality of resultant blended images from the multi-frame processing by analyzing the input frames and transforming them using a parametric score of the input features/frame characteristics. Details of the above aspects performed by the system 202 shall be explained below.

The system may include a processor 204, a memory 206, modules 208, an image sensor 210, an input frame analysis module 212, a transformation module 214, and a multi-frame blending module 216. In an embodiment, the processor 204, the memory 206, the modules 208, the image sensor 210, the input frame analysis module 212, the transformation module 214, and the multi-frame blending module 216 may be communicatively coupled to one another. At least one of the pluralities of the modules 208 may be implemented through an AI model. A function associated with AI may be performed through the non-volatile memory or the volatile memory, and/or the processor.

The processor 204 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

A plurality of processors control the processing of the input data in accordance with a predefined operating rule or artificial intelligence (AI) model stored in the non-volatile memory or the volatile memory. The predefined operating rule or artificial intelligence model is provided through training or learning. Here, being provided through learning means that, by applying a learning technique to a plurality of learning data, a predefined operating rule or AI model of a desired characteristic is made. The learning may be performed on a device itself in which AI according to an embodiment is performed, and/or may be implemented through a separate server/system. The AI model may consist of a plurality of neural network layers. Each layer has a plurality of weight values and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning technique is a method for training a predetermined target device (for example, a robot) using a plurality of learning data to cause, allow, or control the target device to make a determination or prediction. Examples of learning techniques include, but are not limited to, supervised learning, unsupervised learning, semi-supervised learning, or reinforcement learning.

According to the present subject matter, in a method of an electronic device, a method of for enhancing image quality. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training technique. The artificial intelligence model may include a plurality of neural network layers. Each of the plurality of neural network layers may include a plurality of weight values and performs neural network computation by computation between a result of computation by a previous layer and the plurality of weight values.

Visual understanding is a technique for recognizing and processing things as does human vision and may include, e.g., object recognition, object tracking, image retrieval, human recognition, scene recognition, 3D reconstruction/localization, or image enhancement.

As would be appreciated, the system 202, may be understood as one or more of a hardware, a software, a logic-based program, a configurable hardware, and the like. In an example, the processor 204 may be a single processing unit or a number of units, all of which could include multiple computing units. The processor 204 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 104 may be configured to fetch and/or execute computer-readable instructions and/or data stored in the memory 106.

In an example, the memory 206 may include any non-transitory computer-readable medium known in the art including, for example, volatile memory, such as static random-access memory (SRAM) and/or dynamic random-access memory (DRAM), and/or non-volatile memory, such as read-only memory (ROM), erasable programmable ROM (EPROM), flash memory, hard disks, optical disks, and/or magnetic tapes. The memory 206 may include the data. The data serves, amongst other things, as a repository for storing data processed, received, and generated by one or more of the processor 204, the memory 206, the modules 208, the image sensor 210, the input frame analysis module 212, the transformation module 214, and the multi-frame blending module 216.

The module(s) 208, amongst other things, may include routines, programs, objects, components, data structures, etc., which perform particular tasks or implement data types. The module(s) 208 may also be implemented as, signal processor(s), state machine(s), logic circuitries, and/or any other device or component that manipulate signals based on operational instructions. Further, the module(s) 208 may be implemented in hardware, as instructions executed by at least one processing unit, e.g., processor 204, or by a combination thereof. The processing unit may be a general-purpose processor that executes instructions to cause the general-purpose processor to perform operations or, the processing unit may be dedicated to performing the required functions. In another aspect of the present disclosure, the module(s) 208 may be machine-readable instructions (software) which, when executed by a processor/processing unit, may perform any of the described functionalities. In some example embodiments, the module(s) 208 may be machine-readable instructions (software) which, when executed by a processor 204/processing unit, perform any of the described functionalities.

In an embodiment, the processor 204 may be configured to receive a plurality of input frames with a metadata from the image sensor 210. The image sensor 210 may be configured to capture a burst raw noisy images. The metadata include at least one of ISO values, BV values, and exposure values of the image sensor 210.

The input frame analysis module 212 may include a features module 218, and a parametric score module 220. The input frame analysis module 212 may be configured to determine one or more feature scores for the received plurality of input frames. The input frame analysis module 212 may be configured to extract one or more feature of the received input frames using a contextual data. Further, the contextual data may be determined based on one or more image capture condition including ISO per frame, exposure time, and light condition. The input frame analysis module 212 may be configured to calculate a score of at least one extracted feature of the received input frames based on a level of the at least one extracted feature. For example, the input frame analysis module 212 may be configured to calculate a sharpness score, a noise score, a brightness score and other similar feature score. The input frame analysis 212 module may be configured to determine a parametric score for the received input frame based on analysis of the determined one or more feature scores and the metadata of the received input frame.

In an embodiment, the input frame analysis module 212, for determination of the parametric score, maybe configures to generate a vector score of at least one of the feature score of the received input frame based on a weighted average of one or more the feature score of the received input frame. The input frame analysis module 212 may be configured to blend generated vector score of one or more feature of the received input frame. The input frame analysis module 212 may be configured to scale the blended generated vector score. The input frame analysis module 212 may be configured to correlate one or more generated feature vectors respective of each of the one or more generated feature vectors based on scaled score of the blended generated vector.

In an embodiment, the transformation module 214 may be configured to identify one or more artifacts for correction in the received input frame based on the parametric score. The transformation module 214 may be configured to estimate a quality of at least one feature of the received input frame based on the parametric score. The quality may be estimated based on at least one of peak signal-to-noise ratio (PSNR), Structural Similarity Index (SSIM) or multi-scale structural similarity (MS-SSIM) rating perceptual quality. The transformation module 214 may be configured to prioritize one or more features based on the estimated quality of received input frame.

In an embodiment, the transformation module 214 may be configured to determine the strength of correction, based on the estimated quality and the prioritized feature, for at least one artifact in the received input frame. The transformation module 214 may be configured to apply the determined strength for artifact correction in a corresponding input frame based on the parametric score. The transformation module 214 may be configured to determine a strength of correction required for at least one identified artifact in at least one received input frame based on the parametric score. The transformation module 214 may be configured to apply the determined strength for artifact correction in each input frame. The transformation module 214 may be configured to adjust the parametric score of the received input frame to produce optimal result in a low light conditions. The transformation module 214 may be configured to update the parametric score with change in the image capture condition by controlling the parametric score based on the received metadata of the image capture condition.

Subsequently, the multi-frame blending module 216 may include reference frame selection 222, an image registration module, and a blending module 226. The multi-frame blending module 216 may be configured to perform multi-frame blending for the artifact corrected input frames.

Figure 3:
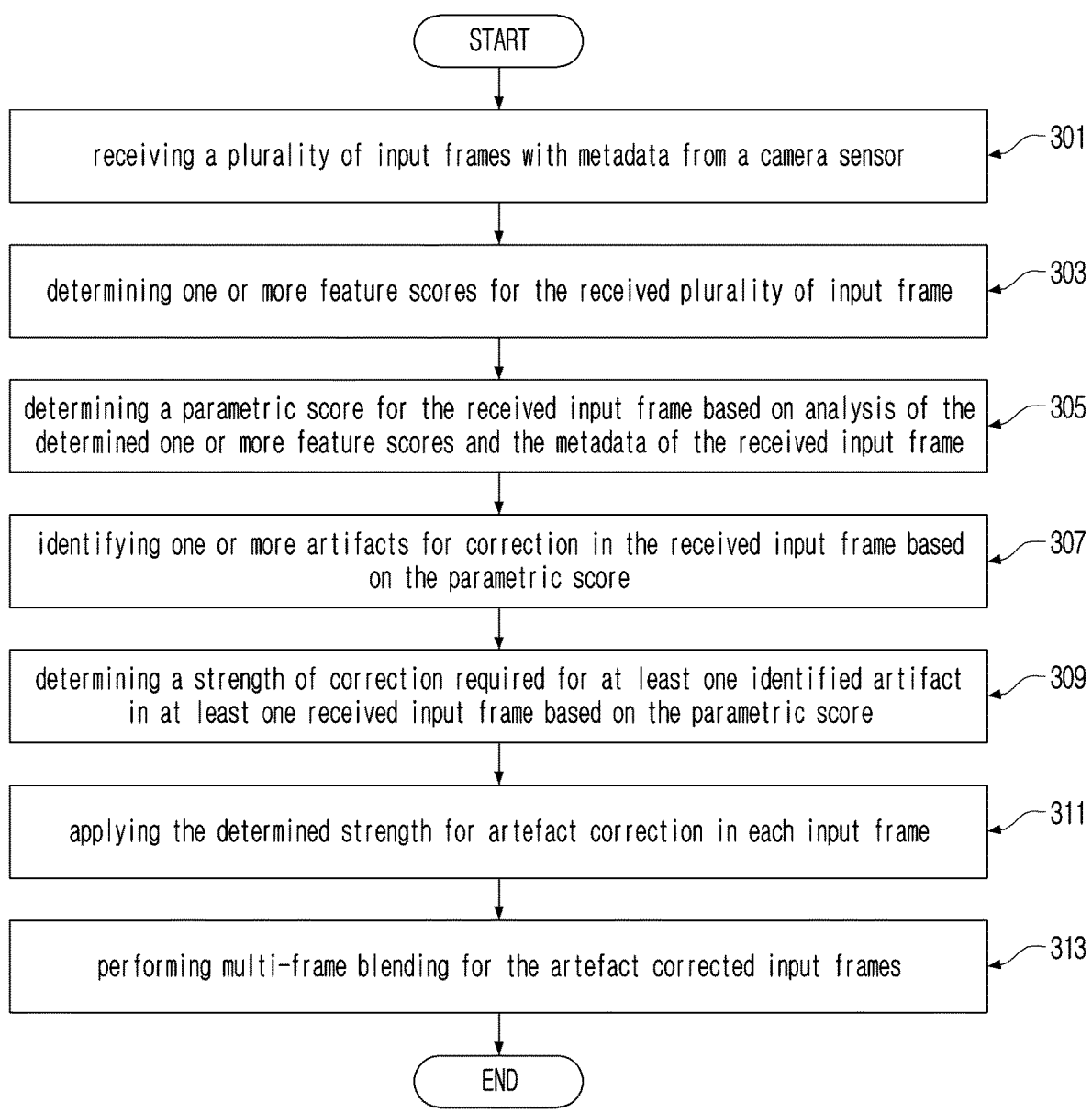
FIG. 3 illustrates a flow diagram depicting a method for enhancing image quality, in accordance with an embodiment of the present subject matter.

FIG. 3 illustrates a flow diagram 300 depicting a method for enhancing image quality according to an embodiment of the present subject matter. The method 300 may include receiving, at operation 301, a plurality of input frames with metadata from an image sensor 210. The metadata may include at least one of ISO values, BV values, and exposure values of the camera sensor.

In an embodiment, the method 300 may include determining, at operation 303, by the input frame analysis 212, one or more feature scores for the received plurality of input frames. The determination of the one or more feature scores may include extracting one or more features of the received input frames using a contextual data and calculating a score of at least one extracted feature of the received input frames based on a level of the at least one extracted feature. Further, the contextual data may be determined based on one or more image capture condition including ISO per frame, exposure time, and light condition.

In an embodiment, the method 300 may include determining, at operation 305, by the input frame analysis module 212, a parametric score for the received input frame based on analysis of the determined one or more feature scores and the metadata of the received input frame. The determination of the parametric score may include generating a vector score of at least one of the feature scores of the received input frame based on a weighted average of the one or more feature scores of the received input frame, blending generated vector score of one or more features of the received input frame, scaling the blended generated vector score and correlating one or more generated feature vectors respective of each of the one or more generated feature vectors based on scaled score of the blended generated vector.

In an embodiment, the method 300 may include identifying, at operation 307, by the input frame analysis module 212, one or more artifacts for correction in the received input frame based on the parametric score. The method may include estimating a quality of at least one feature of the received input frame based on the parametric score. The quality maybe estimated based on at least one of peak signal-to-noise ratio (PSNR), Structural Similarity Index (SSIM) or multi-scale structural similarity (MS-SSIM) rating perceptual quality. The method may include prioritizing one or more features based on the estimated quality of received input frame. The method may include determining, by the input frame analysis module 212, the strength of correction, based on the estimated quality and the prioritized feature, for at least one artifact in the received input frame. The method may include applying, by the input frame analysis module 212, the determined strength for artifact correction in a corresponding input frame based on the parametric score.

In an embodiment, the method 300 may include determining, at operation 309, by the transformation module 214, a strength of correction required for at least one identified artifact in at least one received input frame based on the parametric score.

In an embodiment, the method 300 may include applying, at operation 311, by the transformation module 214, the determined strength for artifact correction in each input frame. The method may include adjusting, by the transformation module 214, the parametric score of the received input frame to produce optimal result in a low light conditions. The method may include updating, by the transformation module 214, the parametric score with change in the image capture condition by controlling the parametric score based on the received metadata of the image capture condition.

Subsequently, the method 300 may include performing at operation 313, multi-frame blending for the artifact corrected input frames. This operation may be performed by the multi-frame blending module 216.

Figure 4:
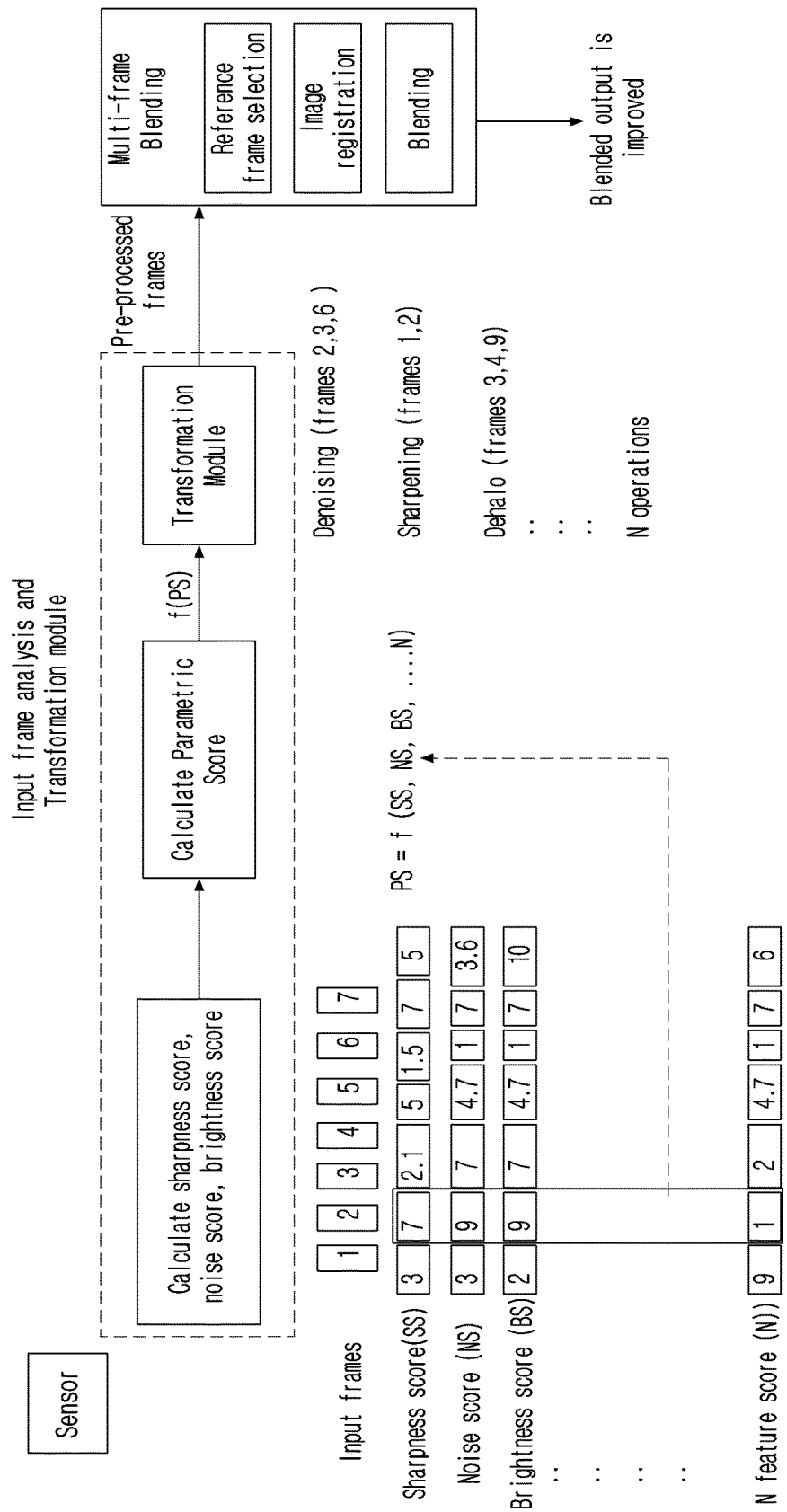
FIG. 4 illustrates a flow diagram depicting an exemplary embodiment of a multi-frame blending scenario, in accordance with an embodiment of the present subject matter.

FIG. 4 illustrates a flow diagram 400 depicting an exemplary embodiment of a multi-frame blending scenario, in accordance with an embodiment of the present subject matter. In an embodiment, the image sensor 210 receives the plurality of input image frame for multi-frame blending. The input frame image may be represented as 1, 2, 3, 4, 5, 6, 7. This operation may correspond to the operation 301. The input image frame analysis module 212 may be configured to determine at least one feature scores extracted from the received plurality of input frames. The multiple features score may include at least one of score related to sharpness, noise, brightness, and light intensity score. This operation may correspond to the operation 303. Further, the input frame analysis module 212 may be also configured to determine parametric score for each frame as a function of input features. In some embodiments, the input frame analysis module 212 may be configured to determine parametric score for each frame as a function of input features and/or the metadata of the input frame. This operation may correspond to the operation 305. The parametric score may be represented as PS=f (SS, NS, BS, . . . N). Further, the transformation module 214 may be configured to apply corresponding strength of pre-processing to each of the plurality of input frames based on the parametric score. The pre-processing may include at least one heavy denoising or light denoising processing, heavy sharpness enhancement or light sharpness enhancement. For example, denoising processing of the frames 2, 3, 6 and sharpening processing of the frames 1, 2. This operation may correspond to the operation 311. Subsequently, multi-frame blending module 216 may be configured blend one or more frames from the plurality of frames to a blended image output. This operation may correspond to the operation 313.

Figure 5A:
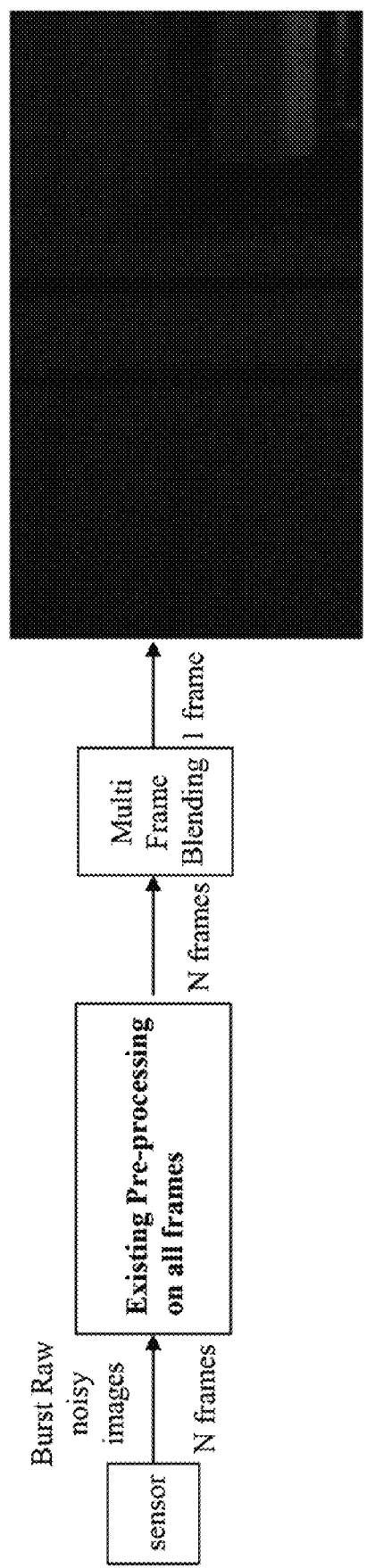
FIG. 5A and FIG. 5B illustrate flow diagrams depicting an exemplary embodiment extreme low light denoising using proposed solution, in accordance with an embodiment of the present subject matter.
Figure 5B:
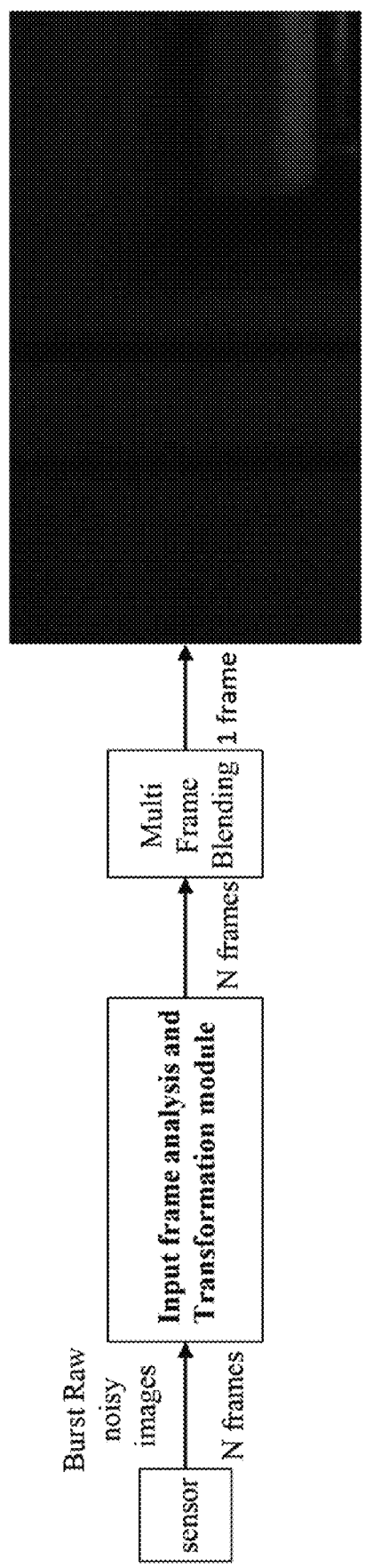

FIG. 5A and FIG. 5B illustrate flow diagrams depicting an exemplary embodiment including extreme low light denoising using proposed solution, in accordance with an embodiment of the present subject matter. In an example, as shown in FIG. 5A, the image sensor may be configured to receive to burst raw noisy images. Thereafter, the received image frame maybe pre-processed using the existing technique before multi-framing blending. However, the blended output may have artifacts having noise, blur edges, and colour artifacts. Thus, the existing technique is not suitable low light capture. Further, when same received input image frame is processes by the proposed solution, the blended output image is much clear for an extreme low light denoising. As shown in FIG. 5B, the image sensor may be configured to receive to burst raw noisy images. Thereafter, the received image frame maybe processes by the input frame analysis 214 and transformation module 216. The blended output image maybe much clear.

Figure 6A:
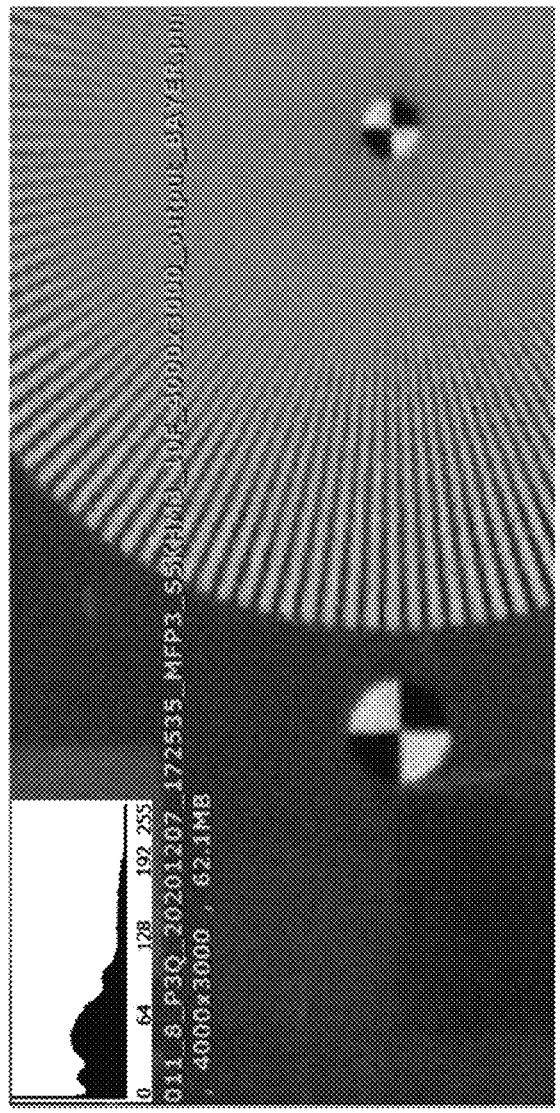
FIG. 6A and FIG. 6B illustrate flow diagrams depicting an exemplary embodiment partial frames denoising based on sharpness using proposed solution, in accordance with an embodiment of the present subject matter.
Figure 6B:
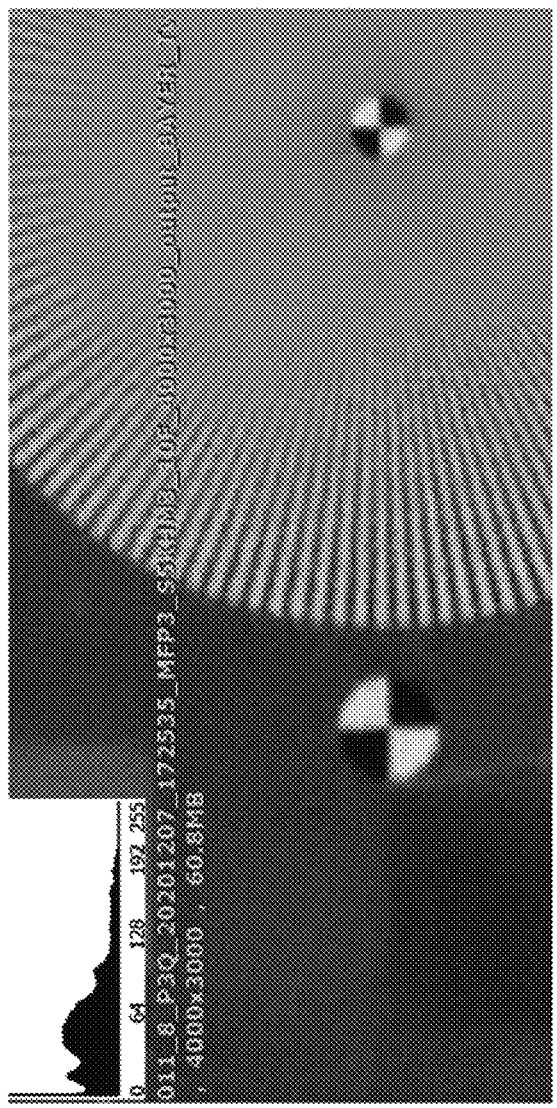

FIG. 6A and FIG. 6B illustrate flow diagrams depicting an exemplary embodiment including partial frames denoising based on sharpness, in accordance with an embodiment of the present subject matter. FIG. 6A shows a blended image using the existing technique, having noise, blur edges, and colour artifacts. FIG. 6B shows an image obtained after denoising the input frames using proposed solution. In an embodiment, 8 of the 10-input frames are denoised based on the sharpness.

Figure 7A:
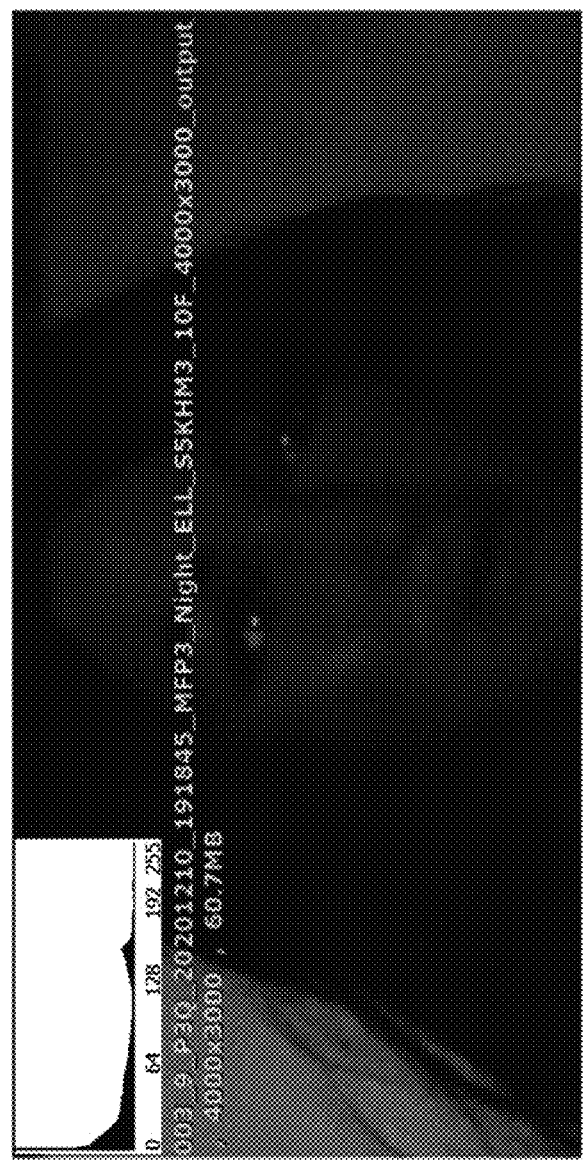
FIG. 7A and FIG. 7B illustrate diagrams depicting another exemplary embodiment partial frames denoising based on sharpness using proposed solution, in accordance with an embodiment of the present subject matter.
Figure 7B:
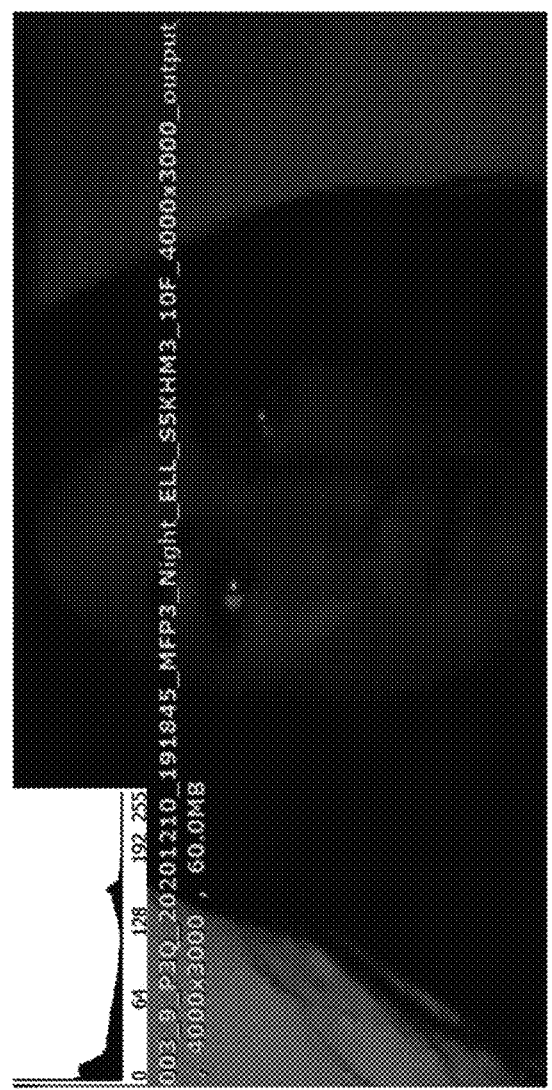

FIG. 7A and FIG. 7B illustrate diagrams depicting another exemplary embodiment including partial frames denoising based on sharpness, in accordance with an embodiment of the present subject matter. FIG. 7A shows a blended image output using the existing technique. The blended image output hasnoise, and blurred edges. In an embodiment, FIG. 7B shows an image obtained after denoising the input frames based using proposed solution. The input frames may be denoised based on sharpness.

Figure 8A:
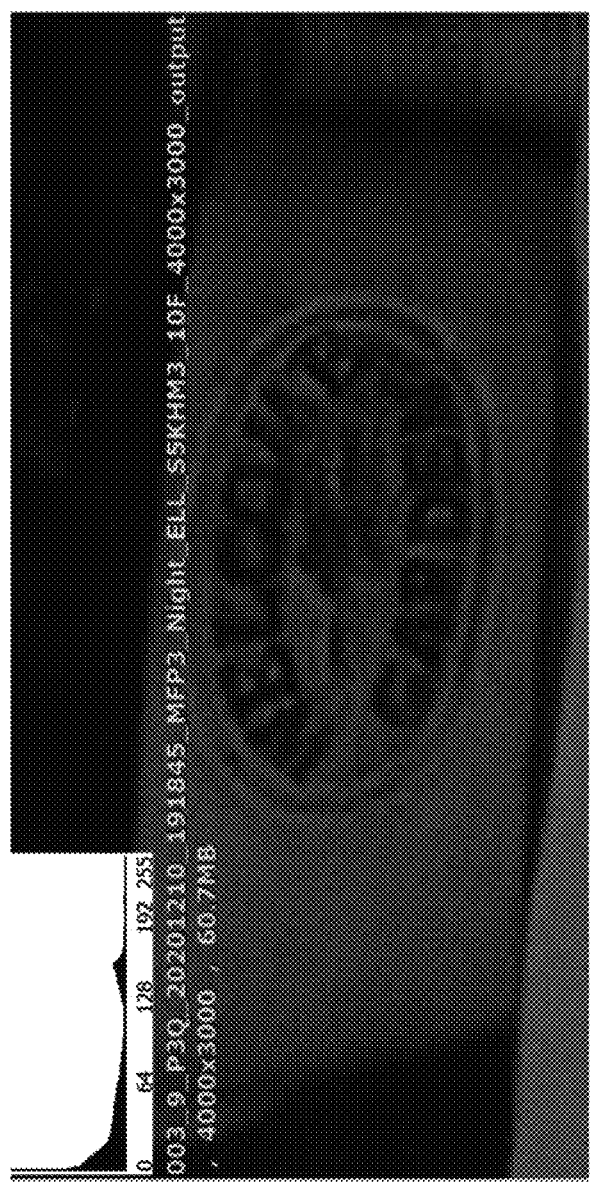
FIG. 8A and FIG. 8B illustrate diagrams depicting yet another exemplary embodiment partial frames denoising based on sharpness using proposed solution, in accordance with an embodiment of the present subject matter.
Figure 8B:
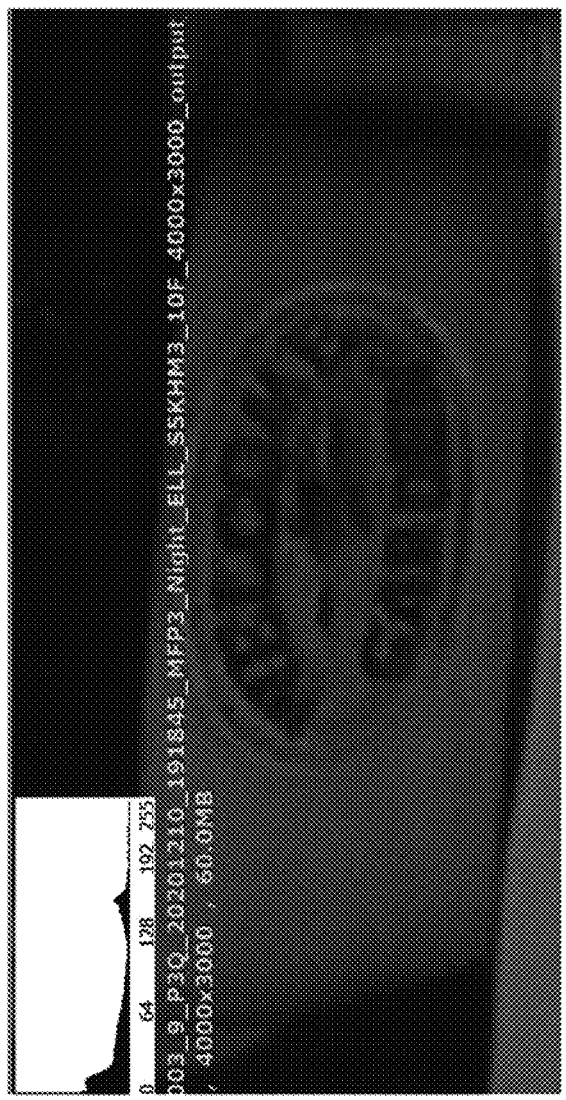

FIG. 8A and FIG. 8B illustrate diagrams depicting yet another exemplary embodiment partial frames denoising based on sharpness, in accordance with an embodiment of the present subject matter. FIG. 8A shown a blended image using the existing technique. Thus, the existing technique is not suitable for low light capture. FIG. 8B shows an image obtained after denoising the input frames based on sharpness using proposed solution.

Figure 9A:
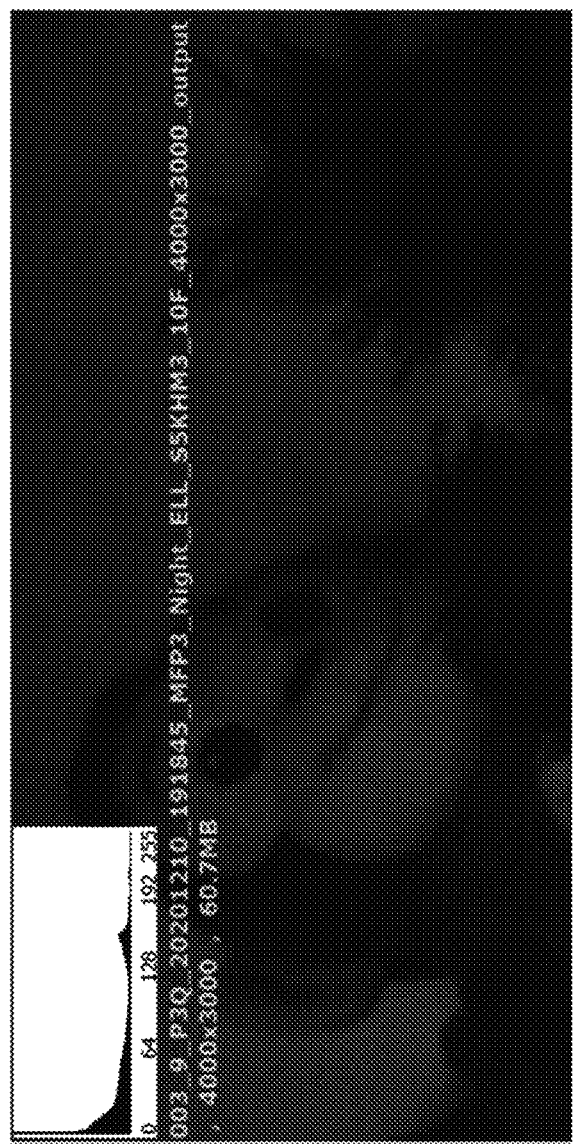
FIG. 9A and FIG. 9B illustrate diagrams depicting yet another exemplary embodiment partial frames denoising based on sharpness using proposed solution, in accordance with an embodiment of the present subject matter.
Figure 9B:
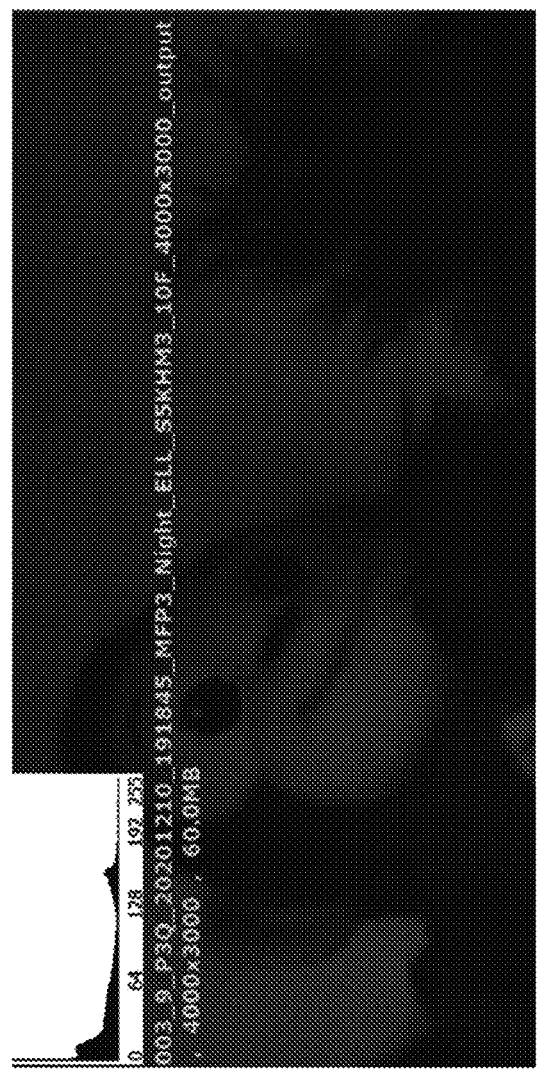

FIG. 9A and FIG. 9B illustrate diagrams depicting yet another exemplary embodiment including partial frames denoising based on sharpness using proposed solution, in accordance with an embodiment of the present subject matter. FIG. 9A shows a blended image using the existing technique, having noise, blur edges, and colour artifacts. FIG. 9B shows an image obtained after denoising the input frames based on sharpness using proposed solution.

In view of the aforesaid, there are provided various advantageous features relating to the present disclosure:
  Control on various parameters of the output such as denoising level, edge enhancement and brightness control, and
  Improvement in the outputs of multi-frame blending specially in low light and extreme low light conditions.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method of enhancing image quality, the method comprising:
  receiving a plurality of input frames and metadata from an image sensor;
  determining a respective plurality of feature scores associated with each input frame of the plurality of input frames;
  determining a respective parametric score associated with each input frame based on the respective plurality of feature scores associated with each input frame and the metadata;
  identifying one or more artifacts for correction in each input frame based on the respective parametric score;
  determining a first type of artifact for which a plurality of first input frames need to be corrected and a second type of artifact for which a plurality of second input frames need to be corrected, with the first type of artifact being different than the second type of artifact;
  applying a first transformation associated with the first type of artifact to the plurality of first input frames and a second transformation associated with the second type of artifact to the plurality of second input frames;
  performing multi-frame blending for the plurality of first input frames and the plurality of second input frames to which respective transformations have been applied;
  estimating a quality of at least one feature of one or more features of a first input frame based on the respective parametric score, wherein the quality is estimated based on at least one of peak signal-to-noise ratio (PSNR), Structural Similarity Index (SSIM) or multi-scale structural similarity (MS-SSIM) rating perceptual quality;
  prioritizing the one or more features based on the estimated quality of the first input frame;
  determining a strength of correction, based on the estimated quality and the prioritizing, associated with the first type of artifact in the first input frame; and
  applying the determined strength of correction in the first input frame based on the respective parametric score, wherein the determining the respective parametric score comprises:
generating a vector score of at least one of the respective plurality of feature scores of the first input frame based on a weighted average of the respective plurality of feature scores of the first input frame;
blending generated vector score of the respective plurality of feature scores of the first input frame;
scaling the blended vector score; and
correlating one or more vector scores respective of each of the one or more generated feature vectors based on sealed score of the blended vector score.

2. The method as claimed in claim 1, wherein the determining the respective plurality of feature scores comprises:
extracting at least one feature of the first input frame using a contextual data, wherein the contextual data is determined based on one or more image capture condition including ISO per frame, exposure time, and light condition; and
calculating a score of the at least one feature of the first input frame based on a level of the at least one feature.

3. The method as claimed in claim 1, further comprises:
adjusting the respective parametric score of the plurality of input frames to produce an optimal result in a low light conditions.

4. The method as claimed in claim 1, further comprises:
updating the respective parametric score with a change in an image capture condition; and
controlling the respective parametric score based on the metadata.

5. The method as claimed in claim 1, wherein the metadata includes at least one of ISO values, BV values, and exposure values of the image sensor.

6. A system of enhancing image quality, the system comprising:
an image sensor;
an input frame analyzer;
a transformer; and
at least one processor,
wherein the at least one processor is configured to:
receive a plurality of input frames and metadata from the image sensor;
determine a respective plurality of feature scores associated with each input frame from the received plurality of input frames;
determine a respective parametric score associated with each input frame based on the respective plurality of feature scores associated with each input frame and the metadata;
identify one or more artifacts for correction in each input frame based on the respective parametric score;
determine a first type of artifact for which a plurality of first input frames need to be corrected and a second type of artifact for which a plurality of second input frames need to be corrected, with the first type of artifact being different than the second type of artifact;
apply a first transformation associated with the first type of artifact to the plurality of first input frames and a second transformation associated with the second type of artifact to the plurality of second input frames; and
perform multi-frame blending for the plurality of first input frames and the plurality of second input frames to which respective transformations have been applied;
wherein the input frame analyzer, for the determining the respective parametric score by the at least one processor, is configured to:
generate a vector score of at least one of the respective plurality of feature scores of a first input frame based on a weighted average of the respective plurality of feature scores of the received input frame;
blend generated vector score of the respective plurality of feature scores of the first input frame;
scale the blended vector score; and
correlate one or more vector scores respective of each of the one or more generated feature vectors bases on sealed score of the blended vector score
wherein the transformer is configured to:
estimate a quality of at least one feature of one or more features of the first input frame based on the respective parametric score, wherein the quality is estimated bases on at least one of peak signal-to-noise ratio (PSNR), Structural Similarity Index (SSIM) or multi-scale structural similarity (MS-SSIM) rating perpetual quality;
prioritize the one or more features based on the estimated quality of the first input frame;
determine a strength of correction, based on the estimated quality and the prioritizing, associated with the first type of artifact in the first input frame; and
apply the determined strength of correction in the first input frame based on the respective parametric score.

7. The system as claimed in claim 6, wherein the input frame analyzer, for the determining the respective plurality of feature scores by the at least one processor, is configured to:
extract at least one feature of the first input frame using a contextual data, wherein the contextual data is determined based on one or more image capture condition including ISO per frame, exposure time, and light condition; and
calculate a score of the at least one feature of the first input frame based on a level of the at least one feature.

8. The system as claimed in claim 6, wherein the transformer is configured to adjust the respective parametric score of the plurality of input frames to produce an optimal result in a low light conditions.

9. The system as claimed in claim 6, wherein the transformer is further configured to update the respective parametric score with a change in an image capture condition to control the respective parametric score based on the received metadata.

10. The system as claimed in claim 6, wherein the metadata includes at least one of ISO values, BV values, and exposure values of the image sensor.

* * * * *